J. THOMSEN.
VEHICLE TIRE.
APPLICATION FILED MAY 23, 1910.
995,738.
Patented June 20, 1911.
2 SHEETS—SHEET 1.
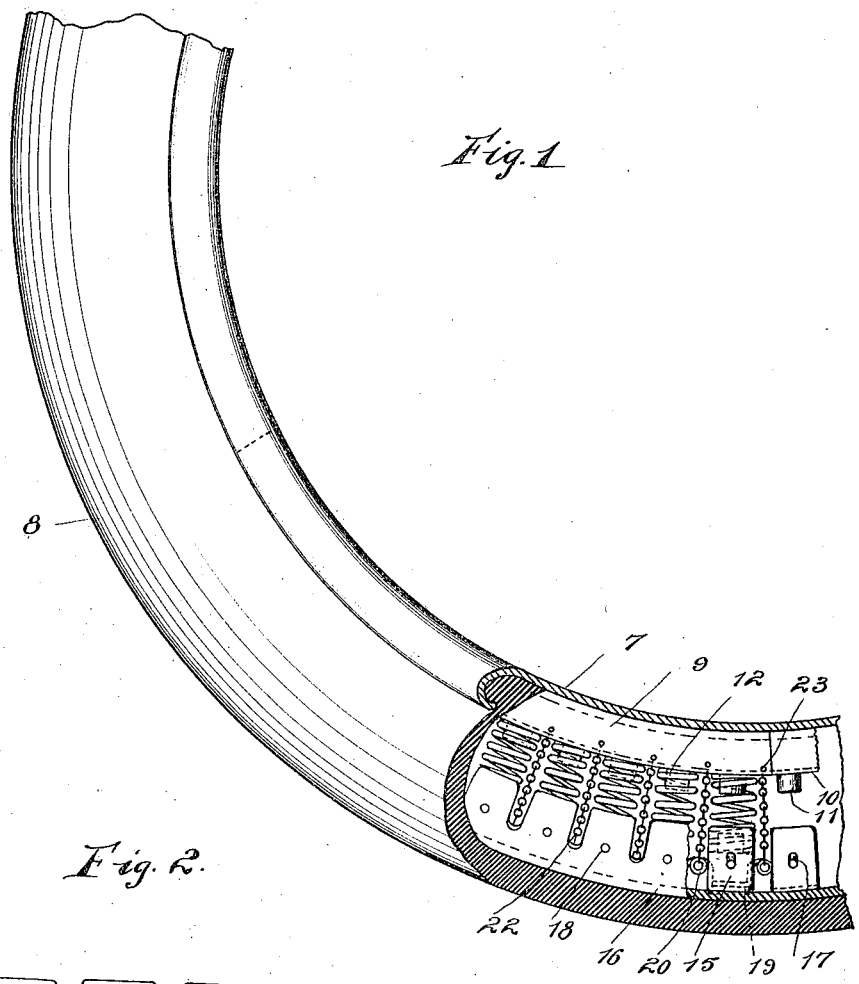
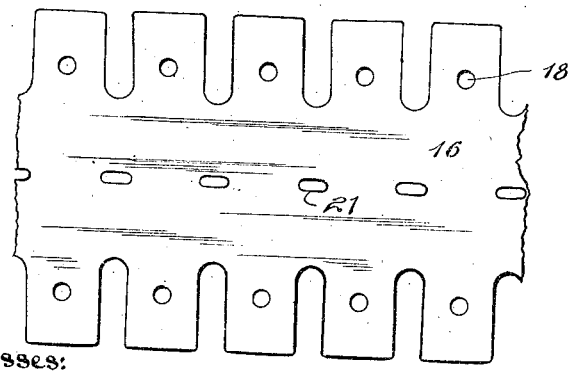
Witnesses:
A. W. Fenstemaker
H. Ringo
Inventor,
Johannes Thomsen,
By Glenn S. Noble
Att'y.

J. THOMSEN.
VEHICLE TIRE.
APPLICATION FILED MAY 23, 1910.
995,738.
Patented June 20, 1911.
2 SHEETS—SHEET 2.
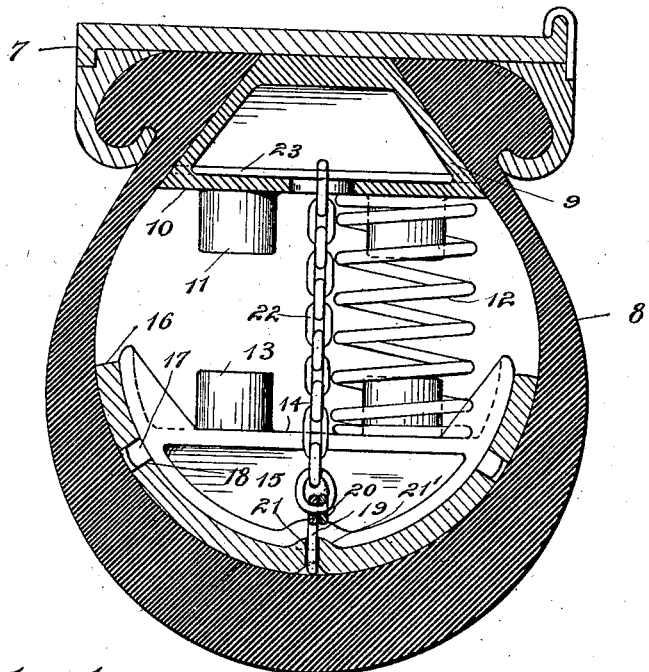
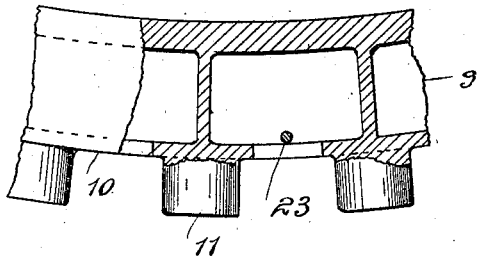
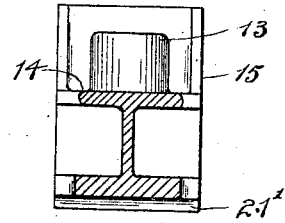
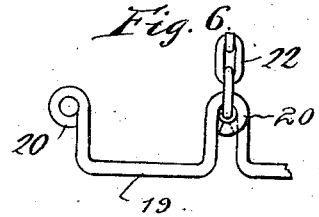
Witnesses:
Alt. Fenstemaker
H. Riess
Inventor,
Johannes Thomsen
By Glenn S. Noble,
Att'y.

UNITED STATES PATENT OFFICE.

JOHANNES THOMSEN, OF CHICAGO, ILLINOIS.

VEHICLE-TIRE.

995,738.  Specification of Letters Patent.  Patented June 20, 1911.

Application filed May 23, 1910. Serial No. 562,871.

*To all whom it may concern:*

Be it known that I, JOHANNES THOMSEN, a citizen of the United States, residing at Chicago, in the county of Cook and State of Illinois, have invented certain new and useful Improvements in Vehicle-Tires, of which the following is a specification.

The desirability of large resilient tires for vehicles and particularly those of the power-driven class, such as automobiles, motor trucks, and the like, has been clearly established. While pneumatic tires have given more or less success, their objectionable features, such as liability to puncture, overheating, failure of inner tubes, are so great as to make it exceedingly desirable to provide a tire having certain of the advantages of the pneumatic tires while at the same time avoiding their various objectionable features. The present invention is designed to provide a tire having such advantageous features of resiliency, durability and simplicity in construction, and which will be durable in use and not readily injured by punctures, neglect of attention, or any other ways common to pneumatic tires.

While my invention may be applied in various ways, I have shown it in the accompanying drawings as adapted to a standard or common form of vehicle rim and with a regular type of pneumatic tire casing.

In these drawings—Figure 1 represents a portion of a wheel tire embodying this invention, parts being omitted or broken away for convenience in illustration; Fig. 2 is an enlarged detail showing the band or flap for protecting the inner surface of the casing; Fig. 3 is an enlarged detail cross sectional view; Fig. 4 is a longitudinal sectional view showing a portion of the inner spring-supporting ring; Fig. 5 is a sectional detail of one of the spring-pressed segmental members or shoes which act against the outer casing; and Fig. 6 is a detail showing the stirrups or links and means for connecting the same.

As shown in these drawings, 7 represents a rim of any well known construction, but preferably a rim of the type used with quick detachable tires. An outer casing 8 engages with such rim, and its inner edges are held in locking position by means of a ring 9 which fits between the opposed faces of such inner edges as indicated in Figs. 1 and 3. This ring 9 is preferably made in a number of segments for convenience in assembling, and is also cored out or otherwise formed in order to make it as light as possible. This ring or locking member may be made of any suitable material, but I prefer to form it of cast aluminum in order to make it both light and strong. On the outer face 10 of this ring are outwardly projecting lugs 11, which lugs are preferably arranged in pairs around the circumference of the ring. Springs 12 engage at their inner ends with such lugs 11 and with the face of the ring 9, and at their outer ends, engage with corresponding lugs 13 and the inner faces 14 of the segmental members or shoes 15. These shoes or members are adapted to exert pressure against the inner surface of the casing 8 and to receive pressure therefrom when force is exerted which tends to press such casing toward the rim. While, in some instances, these segmental members or shoes might engage directly with the inner surface of the casing, if such casings are made of rubber, as is desirable for tires of this character, such material is readily worn by frictional contact with metal, and therefore I prefer to insert a strip or band 16 of leather, rawhide, or other suitable resisting fabric between such shoes and the inner surface of the casing.

In order to hold the leather strip securely in position, the shoes 15 are provided with outwardly extending projections 17 which engage with holes 18 through such strip. The leather strip is further held securely in position by means of stirrups or links 19, which have their inwardly projecting ends 20 inserted through the holes 21 in such strip and which fit closely over the outer portion of the shoes 15. In order to permit the portion of the strip engaged by said stirrups or links to be pressed inwardly so that the links will not wear against the casing, the shoes 15 are grooved at their central outer portions as indicated at 21'. The adjacent loops or eyes 20 of the stirrups or clamps 19 are secured together by means of a chain or other flexible connection 22, which chains or flexible connections extend inwardly to the ring 9, where their ends are secured by means of cross pins or rods 23. On account of this construction, it will be noted that not only do such connected stirrups or links 19 hold the strips 16 in position but they also tend to securely hold the shoes or segmental members 15 against circumferential displacement, or, in other words, serve to lock such shoes or members together. These links and chains or flexible connections also serve another purpose, as, in practice, I prefer to flex the springs 12 or give them a certain amount of tension before putting on the outer casing, and such links and chains will hold the springs in their compressed position. By means of this arrangement, the shoes 15 can never be pressed outwardly beyond a fixed distance common to all of such members, and therefore the tension against the casing is relieved and the wearing action minimized. The members 15 are preferably cored out or formed in such manner as to make them as light as possible, for instance, as indicated in Figs. 3 and 5. It will also be noted that the lugs 11 and 13, which preferably fit closely within the springs 12, tend to support such springs against lateral movement, and if desired, these lugs may be extended as indicated in Fig. 3 so that their ends project sufficiently close as to prevent the complete closing of the springs and thereby lessening the tendency of the springs to permanent set. The band or strip 16 is preferably slotted along its edges as indicated in Figs. 1 and 2, so that it will fit snugly within the curved inner surface of the casing and against the outer faces of the shoes or tension members 15.

By having the springs arranged side by side within the casing and making such springs comparatively light, I provide great resiliency for the tire and also strengthen it against side or lateral strains; and furthermore, by having comparatively few different kinds of parts, the tires can be readily repaired, in case of injury to any one of such parts.

While I have illustrated the outer casing 8 as of a form commonly used with pneumatic tires, yet it will readily be understood that any suitable form of casing may be used. Furthermore, in view of the fact that there is little or no likelihood of the casing injuring the inner parts, as is the case with pneumatic tires, such casing may be made of any suitable material, preferably such material as will be somewhat resilient but more particularly which will resist the surface wear; and furthermore, this casing does not need to have its inner surface formed with as great care as with pneumatic tires.

Having thus described my invention, which I do not wish to limit to the exact construction herein shown and described, except as set forth in the appended claims, what I claim and desire to secure by Letters Patent is:

1. The combination of a casing, a sectional ring in the inner portion of said casing, lugs on said ring arranged in pairs transversely to the plane of the wheel, springs engaging with said lugs, a shoe having its outer surface conforming with the outer portion of the inner surface of said casing and having lugs engaging with said springs, a stirrup over said shoe, and flexible connections between said stirrup and said ring for holding said springs under tension and limiting the outward movement of said shoe.

2. In a vehicle tire, the combination of a ring having lugs arranged in pairs transversely to the plane of said ring, springs engaging with said lugs, pressure members having lugs engaging with the outer ends of said springs, a strip or band around said pressure members, holding devices extending through holes in said strip or band and engaging with said pressure members, means for connecting the inwardly extending ends of said holding members, and flexible connections between said inwardly extending ends and said ring.

3. In a vehicle tire, the combination of a rim having clencher flanges, a substantially tubular casing having its inner edges adapted to engage with said flanges, a holding member arranged between said inner edges and adapted to hold the casing in engagement with said flanges, outwardly projecting springs arranged in pairs around the periphery of said holding member, a plurality of shoes, each shoe engaging with a pair of said springs, a strip of leather or similar material between said shoes and said casing, the sides of said strip being slotted along the edges between said shoes, U-shaped stirrups extending through holes in said strip and engaging with said shoes, chains connecting the inwardly extending ends of the U-shaped members and extending inwardly to said holding member, and pins for holding the inner ends of said chains.

JOHANNES THOMSEN.

Witnesses:
CARL H. CRAWFORD,
A. W. FENSTERNAKER.